(12) United States Patent
Bentz et al.

(10) Patent No.: US 10,900,684 B2
(45) Date of Patent: Jan. 26, 2021

(54) THERMOSTAT AND METHOD FOR AN ENVIRONMENTAL CONTROL SYSTEM FOR HVAC SYSTEM OF A BUILDING

(71) Applicant: Johnson Controls Technology Company, Auburn Hills, MI (US)

(72) Inventors: Jedidiah O. Bentz, Wichita, KS (US); Theresa N. Gillette, Wichita, KS (US); Shaun B. Atchison, Wichita, KS (US); John W. Uerkvitz, Valley Center, KS (US)

(73) Assignee: Johnson Controls Technology Company, Auburn Hills, MI (US)

( * ) Notice: Subject to any disclaimer, the term of this patent is extended or adjusted under 35 U.S.C. 154(b) by 100 days.

(21) Appl. No.: 16/380,183

(22) Filed: Apr. 10, 2019

(65) Prior Publication Data

US 2019/0234637 A1 Aug. 1, 2019

Related U.S. Application Data

(63) Continuation of application No. 15/630,562, filed on Jun. 22, 2017, now Pat. No. 10,295,214.

(Continued)

(51) Int. Cl.
| | |
|---|---|
| *F24F 11/30* | (2018.01) |
| *F24F 11/62* | (2018.01) |
| *G05B 15/02* | (2006.01) |
| *F24F 11/63* | (2018.01) |
| *F24F 11/52* | (2018.01) |

(Continued)

(52) U.S. Cl.
CPC .............. *F24F 11/30* (2018.01); *F24F 11/62* (2018.01); *F24F 11/63* (2018.01); *G05B 15/02* (2013.01); *F24F 11/46* (2018.01); *F24F 11/47* (2018.01); *F24F 11/52* (2018.01); *F24F 11/64* (2018.01); *F24F 2110/10* (2018.01); *F24F 2110/20* (2018.01); *F24F 2130/10* (2018.01); *G05B 2219/2642* (2013.01)

(58) Field of Classification Search
CPC .. F24F 11/30; F24F 11/63; F24F 11/62; F24F 2130/10; F24F 11/52; F24F 11/64; F24F 2110/20; F24F 11/47; F24F 2110/10; F24F 11/46; G05B 15/02; G05B 2219/2642
See application file for complete search history.

(56) References Cited

U.S. PATENT DOCUMENTS

| | | | |
|---|---|---|---|
| 4,873,649 A | 10/1989 | Grald et al. | |
| 5,729,474 A * | 3/1998 | Hildebrand | ........ G05D 23/1917 700/276 |

(Continued)

*Primary Examiner* — Ramesh B Patel
(74) *Attorney, Agent, or Firm* — Foley & Lardner LLP (57) ABSTRACT

A control system for a HVAC system includes a user interface configured to present information to a user and receive inputs from the user, a temperature sensor configured to measure an air temperature inside of the building space, and a processing circuit. The processing circuit is configured to receive a user-preferred temperature setpoint, compare the user-preferred temperature setpoint to the measured air temperature, project an energy usage amount for the user-preferred energy setpoint, generate a user comfort score for the user-preferred energy setpoint, generate an overall score for the user-preferred temperature setpoint, and present, by the user interface, the user with a setpoint scoring interface including the overall score.

20 Claims, 6 Drawing Sheets

Related U.S. Application Data (60) Provisional application No. 62/367,353, filed on Jul. 27, 2016.

(51) Int. Cl.

| | | |
|---|---|---|
| *F24F 11/64* | (2018.01) | |
| *F24F 110/20* | (2018.01) | |
| *F24F 11/47* | (2018.01) | |
| *F24F 110/10* | (2018.01) | |
| *F24F 11/46* | (2018.01) | |
| *F24F 130/10* | (2018.01) | |

(56) References Cited

U.S. PATENT DOCUMENTS

| | | | | |
|---|---|---|---|---|
| 5,988,517 A * | 11/1999 | Bauer | ............... | B60H 1/00864 |
| | | | | 165/217 |
| 6,478,233 B1 | 11/2002 | Shah | | |
| 7,469,546 B2 * | 12/2008 | Kates | ............... | F25B 49/005 |
| | | | | 62/129 |
| 7,844,366 B2 * | 11/2010 | Singh | ............... | G05B 15/02 |
| | | | | 700/276 |
| 8,280,556 B2 | 10/2012 | Besore et al. | | |
| 8,437,878 B2 * | 5/2013 | Grohman | ............ | G05B 23/027 |
| | | | | 700/276 |
| 8,850,348 B2 * | 9/2014 | Fadell | ............... | G05B 19/409 |
| | | | | 715/771 |
| 8,994,539 B2 * | 3/2015 | Grohman | ............ | H04L 12/2803 |
| | | | | 340/584 |
| 9,020,647 B2 | 4/2015 | Johnson et al. | | |
| 9,817,409 B2 * | 11/2017 | Murthy | ............... | H02J 3/14 |
| 10,295,214 B2 * | 5/2019 | Bentz | ............... | F24F 11/30 |
| 2004/0117330 A1 * | 6/2004 | Ehlers | ............... | G06Q 50/06 |
| | | | | 705/412 |
| 2007/0043478 A1 * | 2/2007 | Ehlers | ............... | F24F 11/30 |
| | | | | 700/276 |
| 2012/0123594 A1 | 5/2012 | Finch et al. | | |
| 2012/0165993 A1 | 6/2012 | Whitehouse | | |
| 2012/0259469 A1 | 10/2012 | Ward et al. | | |
| 2014/0039692 A1 * | 2/2014 | Leen | ............... | F24F 11/62 |
| | | | | 700/278 |
| 2014/0358291 A1 * | 12/2014 | Wells | ............... | G05D 23/1902 |
| | | | | 700/276 |
| 2015/0267935 A1 * | 9/2015 | Devenish | ............ | F24F 11/30 |
| | | | | 700/278 |
| 2016/0138819 A1 | 5/2016 | Vega | | |
| 2016/0223216 A1 | 8/2016 | Buda et al. | | |

\* cited by examiner

THERMOSTAT AND METHOD FOR AN ENVIRONMENTAL CONTROL SYSTEM FOR HVAC SYSTEM OF A BUILDING

CROSS-REFERENCE TO RELATED PATENT APPLICATION

This application is a continuation of U.S. patent application Ser. No. 15/630,562 filed Jun. 22, 2017, now U.S. Pat. No. 10,295,214, which claims the benefit of and priority to U.S. Provisional Patent Application No. 62/367,353, filed Jul. 27, 2016. The entirety of each of these patent applications is incorporated by reference herein.

BACKGROUND

The present disclosure relates generally to systems and methods for providing improved control of a building or space's heating, ventilating, and air conditioning (HVAC) system through the use of environmental setpoints.

Conventional HVAC systems include a thermostat and are configured for one-way communication to connected components to control HVAC systems by turning on or off certain components or by regulating flow. Each thermostat may include a temperature sensor and a user interface. In conventional thermostats, a user may provide an input to cause the HVAC system to change the temperature inside of a building space. However, conventional thermostats provide little feedback to users as to the impact of such user inputs on the environment and the HVAC system's performance. Thus, there is a need for a thermostat controller with improved capabilities for regulating heating and cooling using one or more environmental factors.

SUMMARY

One embodiment relates to a control system for a heating, ventilating, and air conditioning (HVAC) system. The control system includes a user interface configured to present information to a user and receive inputs from the user. The control system also includes a temperature sensor configured to measure an air temperature inside of the building space. The control system also includes a processing circuit. The processing circuit includes a processor and a memory. The memory storing instructions that are executable by the processor to cause the processor to receive, by the user interface, a user-preferred temperature setpoint. The instructions also cause the processor to compare the user-preferred temperature setpoint to the measured air temperature. The instructions also cause the processor to, based on the comparison, project an energy usage amount for the user-preferred energy setpoint. The instructions also cause the processor to, based on the comparison, generate a user comfort score for the user-preferred energy setpoint. The instructions also cause the processor to, based on the projected energy usage amount and the user comfort score, generate an overall score for the user-preferred temperature setpoint. The instructions also cause the processor to present, by the user interface, the user with a setpoint scoring interface including the overall score.

Another embodiment relates to a computer implemented method. The method includes receiving, by a controller of an HVAC system, a user-preferred temperature setpoint. The method also includes comparing, by the controller, the user-preferred temperature setpoint to the measured air temperature. The method also includes based on the comparison, projecting, by the controller, an energy usage amount for the user-preferred energy setpoint. The method also includes based on the comparison, generating, by the controller, a user comfort score for the user-preferred energy setpoint. The method also includes based on the projected energy usage amount and the user comfort score, generating, by the controller, an overall score for the user-preferred temperature setpoint. The method also includes presenting, by the controller, the user with a setpoint scoring interface including the overall score.

Another embodiment relates to a non-transitory computer readable media having computer-executable instructions embodied therein that, when executed by a process of thermostat, cause the processor to perform operations to control a temperature of a building space. The operations include receiving a user-preferred temperature setpoint. The operations also include comparing the user-preferred temperature setpoint to a measured air temperature. The operations also include, based on the comparison, projecting an energy usage amount for the user-preferred energy setpoint. The operations also include, based on the comparison, generating a user comfort score for the user-preferred energy setpoint. The operations also include, based on the projected energy usage amount and the user comfort score, generating an overall score for the user-preferred temperature setpoint. The operations include presenting the user with a setpoint scoring interface including the overall score.

DETAILED DESCRIPTION

Overview

Referring generally to the figures, an HVAC control system configured to score user-provided temperature setpoints is shown, according to various example embodiments. The HVAC control system described herein may be used in any HVAC system, room, environment, or system within which it is desired to control and/or observe environmental conditions (e.g., temperature, humidity, etc.).

The control system described herein is intended to improve the methodologies through which traditional control systems interface with users. Traditional thermostats typically receive a user-input temperature setpoint (e.g., through a user interface on a thermostat) and provide control signals to various HVAC system components (e.g., fan compressor, heat pump, etc.) to cause the temperature in a building space to converge to the user-input setpoint. There are limitations to such an approach. For example, conventional thermostats that do not provide feedback as to the impact of such setpoints on the environment or the performance of the HVAC system.

The HVAC control system disclosed herein is intended to solve such shortcomings by providing real-time feedback to the user as to the environmental impact of a user-input temperature setpoint. Specifically, in response to receiving a user-input temperature setpoint, the control system disclosed herein is configured to generate a multi-component score for the user-input setpoint. Such a score may include a user comfort component (e.g., determined based on historical usage data) and an energy usage component (e.g., determined based on monitoring past performance of the HVAC system). The control system may present the multi-component score within a graphical user interface (e.g., on a touch display of a thermostat) to educate the user regarding the required energy to operate the HVAC system at the user-input temperature setpoint. Additionally, the control system may suggest an alternative setpoint to the user requiring less energy than the initial user-input setpoint. This way, the user may choose the alternative setpoint and consume less energy using the HVAC system.

HVAC System and Thermostat

Figure 1:
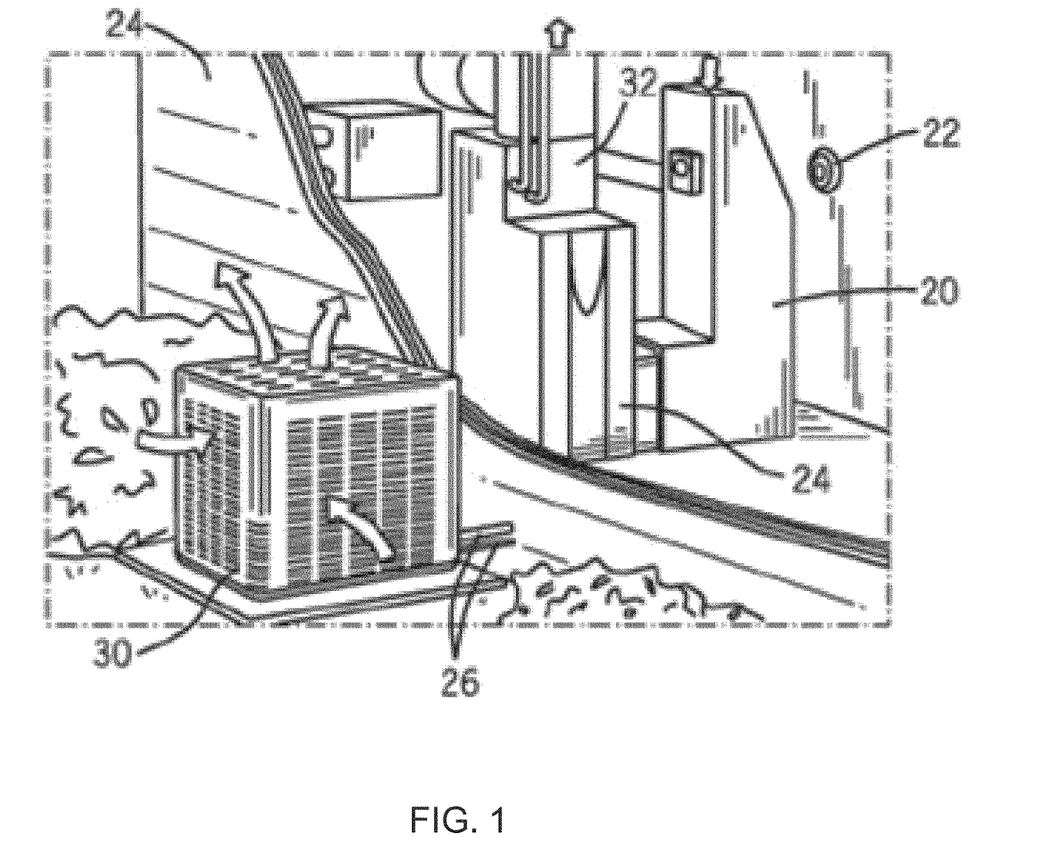
FIG. 1 is an illustration of a residential HVAC system that employs heat exchangers, according to an example embodiment.

FIG. 1 illustrates a residential heating and cooling system. The residential heating and cooling system may provide heated and cooled air to a residential structure, as well as provide outside air for ventilation and provide improved indoor air quality (IAQ) through devices such as ultraviolet lights and air filters. In general, a residence 24 will include refrigerant conduits 26 that operatively couple an indoor unit 28 to an outdoor unit 30. Indoor unit 28 may be positioned in a utility space, an attic, a basement, and so forth. Outdoor unit 30 is typically situated adjacent to a side of residence 24 and is covered by a shroud to protect the system components and to prevent leaves and other contaminants from entering the unit. Refrigerant conduits 26 transfer refrigerant between indoor unit 28 and outdoor unit 30, typically transferring primarily liquid refrigerant in one direction and primarily vaporized refrigerant in an opposite direction.

When the system shown in FIG. 1 is operating as an air conditioner, a coil in outdoor unit 30 serves as a condenser for recondensing vaporized refrigerant flowing from indoor unit 28 to outdoor unit 30 via one of the refrigerant conduits 26. In these applications, coil 32 of the indoor unit serves as an evaporator coil. The coil 32 receives liquid refrigerant (which may be expanded by an expansion device, not shown) and evaporates the refrigerant before returning it to outdoor unit 30.

Outdoor unit 30 draws in environmental air through its sides as indicated by the arrows directed to the sides of the unit, forces the air through the outer unit coil using a fan (not shown), and expels the air as indicated by the arrows above the outdoor unit. When operating as an air conditioner, the air is heated by the condenser coil within the outdoor unit and exits the top of the unit at a temperature higher than it entered the sides. Air is blown over indoor coil 32 and is then circulated through residence 24 by means of ductwork 20, as indicated by the arrows entering and exiting ductwork 20. The overall system operates to maintain a desired temperature as set by system controller 22. When the temperature sensed inside the residence is higher than the set point on the thermostat (with the addition of a relatively small tolerance), the air conditioner will become operative to refrigerate additional air for circulation through the residence. When the temperature reaches the set point (with the removal of a relatively small tolerance), the unit will stop the refrigeration cycle temporarily.

When the unit in FIG. 1 operates as a heat pump, the roles of the coils are simply reversed. That is, the coil of outdoor unit 30 will serve as an evaporator to evaporate refrigerant and thereby cool air entering outdoor unit 30 as the air passes over the outdoor unit coil. Indoor coil 32 will receive a stream of air blown over it and will heat the air by condensing a refrigerant.

The system controller 22 (e.g., a thermostat) may provide control signals to control circuits (not shown) configured to control the operation of the indoor and outdoor units 46 and 48. The control circuits may execute hardware or software control algorithms to regulate the HVAC system. In some embodiments, the control circuits may include one or more microprocessors, analog to digital converters, non-volatile memories, and interface boards. For example, in response to receiving signals from the system controller 22, the control circuits may control operations of fans and refrigerant flow control valves of the indoor and outdoor units 46 and 48 to cause more or less warm or cool air to be provided to a building space so as to change the temperature in the building space.

In accordance with the systems and methods disclosed herein, the system controller 22 is configured to generate sensor signals to be provided to the control circuits based on sensor signals received from various sensors (e.g., temperature sensors and humidity sensors measuring conditions both inside of and outside of a building space), and external server computing systems (e.g., associated with a weather service or a utility company).

The system controller 22 may also control the ventilation to the building. For example, the control device may control various actuators associated with various dampers in the outdoor unit 30 to control the rates at which inside air is expelled to the exterior of the building or outside air is directed to the interior of the building. Additionally, the system controller 22 may control the ventilator or amount of air introduced into various zones (e.g., rooms) of the building by controlling various dampers associated with an air supply duct.

HVAC Control System Providing Environmental Setpoints

Figure 2A:
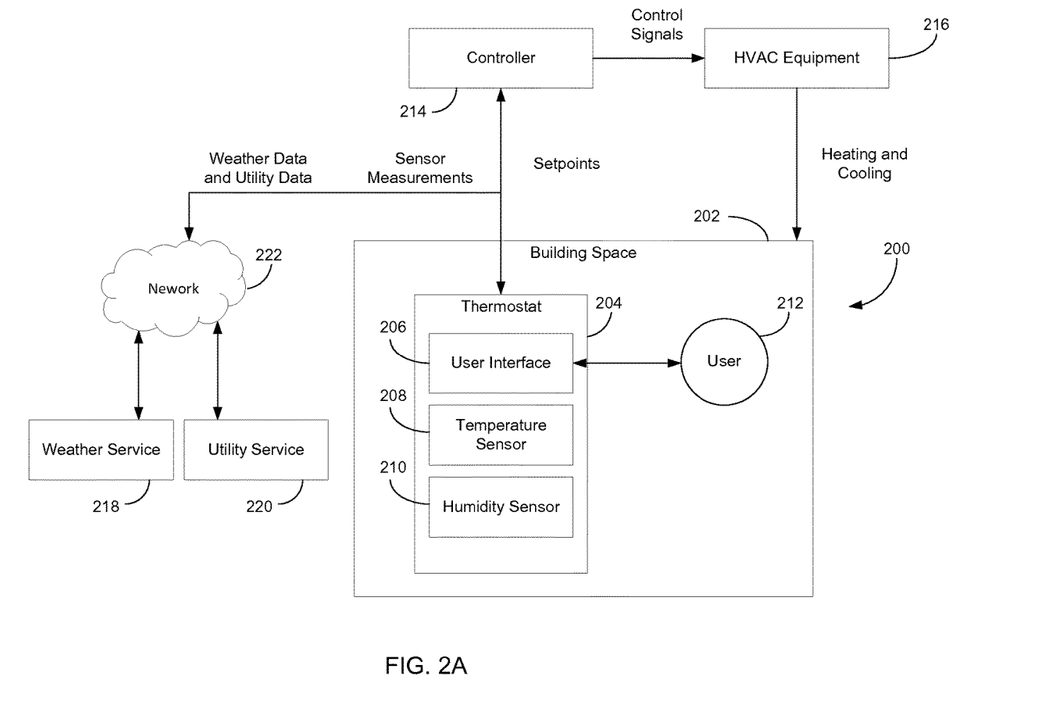
FIG. 2A is a block diagram of a system for controlling the temperature of a building space, according to an example embodiment.

Referring now to FIG. 2A, a system 200 for monitoring and controlling the temperature of a building space 202 is shown, according to an example embodiment. System 200 is shown to include a thermostat 204 installed within a building space 202. In the example shown, the building space 202 includes a single thermostat 204. Thermostat 204 is shown to include a user interface 206 and temperature and humidity sensors 208 and 210 for measuring the temperature and the humidity within the building space 202. User interface 206 includes an electronic display for presenting information to a user 212 and one or more physical input devices (e.g., a rotary knob, pushbuttons, manually-operable switches, etc.) for receiving inputs from a user 212.

The thermostat 204 communicates with a controller 214. In various embodiments, the controller 214 may be integrated with thermostat 204 or may exist as a separate controller (e.g., a field and equipment controller, a supervisory controller, etc.) that receives input from the thermostat 204. The thermostat 204 may send temperature measurements and temperature setpoints to the controller 214. In turn, the controller 214 generates control signals for HVAC equipment 216. In an example embodiment, the HVAC equipment 216 includes the HVAC system discussed above in relation to FIG. 1.

In some embodiments, the thermostat 204 is configured to communicate with a weather service system 218 and a utility service system 220 over a network 222. For example, the weather service system 218 may be associated with an external service provider providing information regarding the weather in the area surrounding the building space 202. The utility service system 220 may be associated with an entity providing energy (e.g., natural gas, electricity) to the building associated with the building space 202, and provide information regarding amounts of energy used by the building over various time periods. The network 222 may include local area networks or wide area networks (e.g., the Internet, a building WAN, etc.).

Figure 2B:
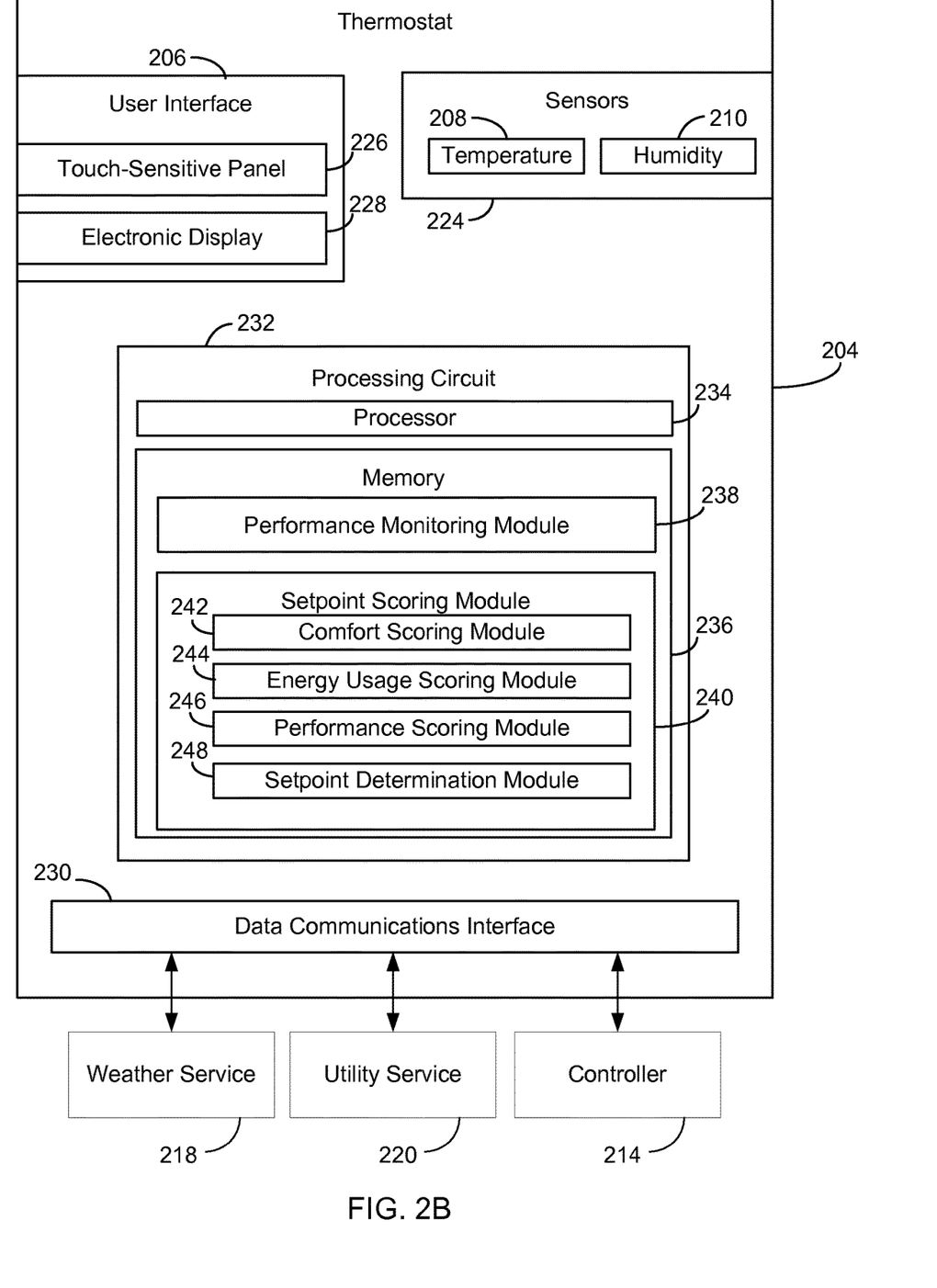
FIG. 2B is a block diagram of a control device of the system of FIG. 2A, according to an example embodiment.

Referring now to FIG. 2B a block diagram illustrating the thermostat 204 in greater detail is shown, according to some embodiments. Thermostat 204 is shown to include a variety of user interface devices 206 and sensors 224. User interface devices 206 may be configured to receive inputs from the user 212 and provide outputs to the user 212 in various forms. For example, user interface devices 206 are shown to include a touch-sensitive panel 226 and an electronic display 228. It is contemplated that user interface devices 206 may include any type of device configured to receive input from a user and/or provide an output to a user in any of a variety of forms (e.g., touch, text, video, graphics, audio, vibration, etc.).

Sensors 224 may be configured to measure a variable state or condition of the environment in which the thermostat 204 is installed (e.g., the building space 202). Sensors 224 may be integrated into the thermostat 204 or be remote from the thermostat 204 and communicate with the thermostat 204 (e.g., wirelessly via the data communications interface 230). In the example shown, the thermostat 204 includes the temperature sensor 208 and a humidity sensor 210 for measuring qualities of the air in the building space 202. In some embodiments, the thermostat 204 may also include external temperature and humidity sensors configured to detect conditions external but proximate to the building space 202.

Still referring to FIG. 2B, thermostat 204 is shown to include a communications interface 230 and a processing circuit 232. Communications interface 230 may include wired and/or wireless interfaces (e.g., jacks, antennas, transmitters, receivers, transceivers, wire terminals, etc.) for conducting data communications with various systems, devices, or networks. For example, communications interface 230 may include an Ethernet card and port for sending and receiving data via an Ethernet-based communications network and/or a Wi-Fi transceiver for communicating via a wireless communications network. Communications interface 230 may be configured to communicate via local area networks or wide area networks (e.g., the Internet, a building WAN, etc.) and may use a variety of communications protocols (e.g., BACnet, IP, LON, etc.). Communications interface 230 may include a network interface configured to facilitate electronic data communications between the thermostat 204 and various external systems or devices (e.g., the controller 214, the weather service system 218, and the utility service system 220).

Processing circuit 232 is shown to include a processor 234 and memory 236. Processor 234 may be a general purpose or specific purpose processor, an application specific integrated circuit (ASIC), one or more field programmable gate arrays (FPGAs), a group of processing components, or other suitable processing components. Processor 234 may be configured to execute computer code or instructions stored in memory 236 or received from other computer readable media (e.g., CDROM, network storage, a remote server, etc.).

Memory 236 may include one or more devices (e.g., memory units, memory devices, storage devices, etc.) for storing data and/or computer code for completing and/or facilitating the various processes described in the present disclosure. Memory 236 may include random access memory (RAM), read-only memory (ROM), hard drive storage, temporary storage, non-volatile memory, flash memory, optical memory, or any other suitable memory for storing software objects and/or computer instructions. Memory 236 may include database components, object code components, script components, or any other type of information structure for supporting the various activities and information structures described in the present disclosure. Memory 236 may be communicably connected to processor 234 via processing circuit 232 and may include computer code for executing (e.g., by processor 234) one or more processes described herein. For example, memory 236 is shown to include a performance monitoring module 238 and an setpoint scoring module 240. In the example shown, the modules 238 and 240 are executed at the thermostat 204. It should be understood that such modules may be executed remotely from the thermostat 204 (e.g., at the controller 214, at an external server, at a user computing device associated with the user 212) in accordance with the present disclosure.

Performance monitoring module 238 is structured to cause the processor 234 to monitor the performance of the HVAC equipment 216 in various situations. For example, the performance monitoring module 238 may include a data logger configured to log the timing of control signals provided by the thermostat 204 and/or controller 214 to the HVAC equipment 216. Additionally, the performance monitoring module 238 may also cause the processor 234 to correlate such control signal timing data with measurements returned by sensors 224. Using such correlated data, the performance monitoring module 238 may determine various run times required by the HVAC equipment 216 to reach and maintain various operational setpoints.

In some embodiments, using such required run times, the performance monitoring module 238 is structured to cause the processor 234 to estimate the energy usage of various setpoints. For example, based on a previously measured run time and utility data (e.g., describing a quantity of energy such as electricity consumed by the user over a predetermined period), the thermostat 204 may estimate an energy amount required for a particular user-input setpoint. As described herein, such energy requirements may be used in scoring user-input setpoints and presenting the user with a graphical user interface.

The setpoint scoring module 240 is structured to cause the processor 234 to generate a score for presentation to the user 212 in response to the user 212 inputting a set point via the user interface devices 206. As shown, the setpoint scoring module 240 includes a comfort scoring module 242, an energy usage scoring module 244, a performance scoring module 246, and a setpoint determination module 248. The comfort scoring module 242 is structured to cause the processor 234 to generate a user comfort subcomponent of an overall setpoint score in response to a user inputting a setpoint. In this regard, the comfort scoring module 242 may include a comfort curve used in the generation of such a subcomponent. For example, in one embodiment the comfort scoring module 242 includes a comfort standard provided by the American Society of Heating, Refrigerating, and Air-Conditioning Engineers (ASHRAE) standard. The standard may provide a setpoint (or series of setpoints) with which to control the HVAC equipment 216 based on measured environmental variables (e.g., a humidity inside of the building space measured by the humidity sensor 210 and a temperature outside of the building space). In such embodiments, the comfort scoring module 242 may cause the processor 234 to generate the user comfort subcomponent based on a deviation between a user-input setpoint and the setpoint(s) suggested by the standard (e.g., setpoints deviating from the standard by greater amounts may receive lower comfort subcomponent scores).

In some embodiments, the comfort scoring module 242 is structured to cause the processor 234 to generate the user comfort subcomponent score using historical setpoint data stored in the memory 236. For example, based on the conditions outside of the building space 202 (e.g., measured by an external temperature sensor), a number of previously used setpoints may be retrieved from the memory 236 and compared with a user-input setpoint to generate a user comfort sub-component score (e.g., the user-input setpoint may be compared with an average of previously used setpoints when the external temperature was within a range of a current external temperature). In some embodiments, such an approach is used in combination with the standard-based approach discussed above. For example, the user comfort subcomponent may include a standard component (e.g., based on a deviation from an ASHRAE standard) and a historical component (e.g., based on historical user setpoint data).

The energy usage scoring module 244 is structured to cause the processor 234 to generate an energy usage subcomponent of an overall setpoint score in response to a user inputting a setpoint. In this regard, the energy usage scoring module 244 may cause the processor 234 to retrieve an energy usage estimate generated by the performance monitoring module 238 based a setpoint input by the user. Based on the retrieved energy usage estimate, the thermostat 204 may generate the energy usage subcomponent. For example, the energy usage scoring module 244 may include a lookup table correlating various energy usage estimations to energy usage subcomponent scores, and the processor 234 may associate the user-input setpoint with a score based on the estimate. In various embodiments, the magnitude of the energy usage subcomponent is inversely proportional to the estimated energy usage of the user-input setpoint. The performance scoring module 246 may similarly cause the processor 234 to generate an HVAC system performance component based on historical system run times (e.g., generated via the performance monitoring module 238) associated with various setpoints.

In some embodiments, upon generating the various subcomponents of the overall setpoint sore, the setpoint scoring module 240 is structured to cause the processor 234 to generate an overall score for a user-input setpoint. The overall score may be a weighted combination of all of the various subcomponent scores (e.g., user comfort, energy usage, system performance). In some embodiments, the weights used in generating the overall setpoint score are dependent on a mode of operation of the HVAC equipment 216 selected by the user 212. For example, in one embodiment, the thermostat 204 includes at least a "comfort mode" and "efficiency mode." When in comfort mode, a first set of weights may be used by the processor 234 in computing the overall score for a user-input setpoint. The first set of weights may emphasize the user comfort subcomponent computed via the comfort scoring module 242. In efficiency mode, a second set of weights may be used that emphasize the energy usage component computed via the energy usage scoring module 244.

In various embodiments, upon computing the overall setpoint score, the processor 234 is configured to compare the overall score to a threshold. Within the setpoint scoring module 240, the threshold is structured to trigger the generation of an alternative setpoint via the setpoint determination module 248 described herein. For example, if the overall score is below the threshold, the setpoint determination module 248 may be triggered to generate an alternative setpoint for presentation to the user via the electronic display 228.

The setpoint determination module 248 is configured to compute an alternative setpoint based on several inputs used in the determination of the overall score for the user-input setpoint. For example, based on current conditions external to the building space 202 (e.g., temperature, humidity) may identify the setpoint that is closest to the user-input setpoint but has an overall score above the threshold. Such a setpoint may be identified from historical usage data. For example, in various embodiments, the memory 236 of the thermostat 204 includes a database component including various entries for a number of previously used setpoints. Each entry may include information pertaining to the conditions external to the building space, information regarding the performance of the HVAC equipment 216 (e.g., estimated run times), and setpoint scoring information (e.g., scores generated via the modules 242, 244, and 246 discussed above when the user first input the setpoints).

Based on the current conditions external to the building space 202, the thermostat 204 may retrieve historical a user setpoint having a value closest to the user-input setpoint but having a higher overall score associated therewith. In an illustrative example where the temperature external to the building space 202 is about 90 degrees Fahrenheit, if user inputs a setpoint of 68 degrees Fahrenheit, the processing circuit 232 executes the modules 242, 244, and 246 to generate an subcomponents and an overall score for the setpoint. The setpoint receives a relatively high user comfort subcomponent score, but a low energy usage subcomponent score. As a result, the overall score for the setpoint is below the threshold, triggering application of the setpoint determination module 248. The setpoint determination module 248 retrieves a previously used setpoint during similar circumstances (e.g., having similar external temperature) that received an overall score higher than the threshold. For example, the previously used threshold may be higher (e.g., 72 degrees Fahrenheit) than the user-input threshold so as to have a higher energy usage subcomponent score and therefore a higher overall score.

In various embodiments, instead of using previously used setpoint data, the setpoint determination module 248 causes the processor 234 to generate an alternative setpoint value in real time. For example, based the current conditions and the comfort curves included in in the comfort scoring module 242, a range of setpoints having acceptable user comfort subcomponent scores (e.g., within a predetermined range) may be identified. Then, the processor 234 may execute the energy usage scoring module 244 for each setpoints in the range of setpoints to identify a setpoint having the highest user comfort subcomponent score among the range of setpoints that also will have an energy usage score meeting various requirements. As such, the generated alternative setpoint is optimized in terms of user comfort and a target energy usage level.

Figure 3:
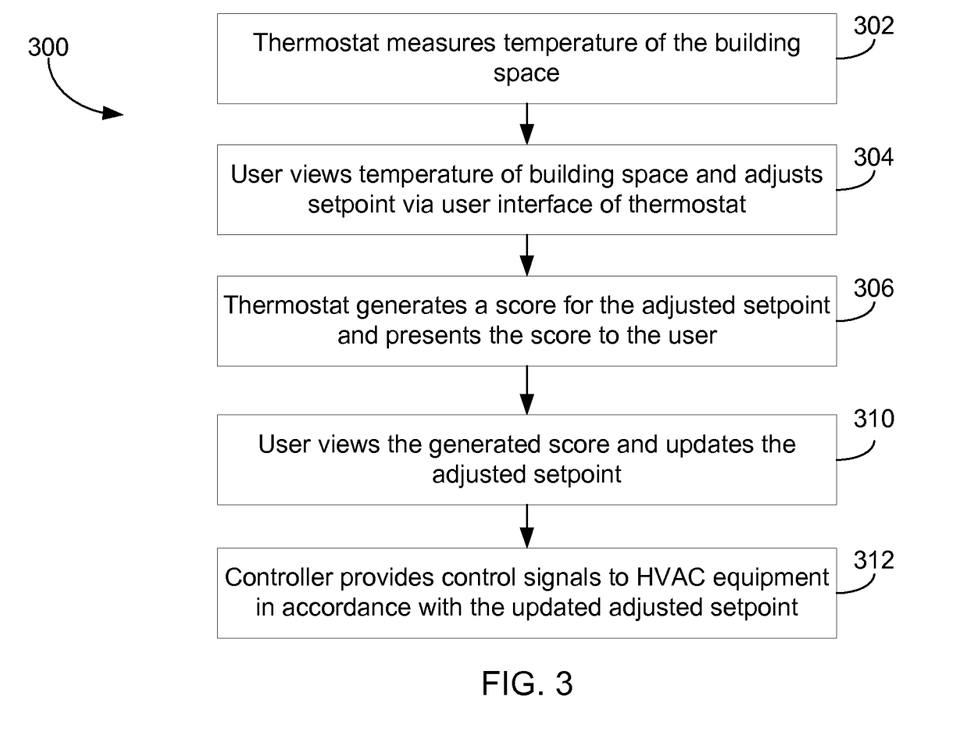
FIG. 3 is a flowchart of a process for controlling the temperature of a building space using a thermostat, according to an example embodiment.

Referring now to FIG. 3, a process 300 for monitoring and controlling the temperature of a building space is shown, according to an example embodiment. Process 300 may be performed by the system 200 as described with reference to FIGS. 2A-2B. In process 300, the thermostat 204 measures the temperature of the building space (block 302). In some embodiments, additional environmental variables inside the building space (e.g., humidity) are also measured. Additionally, the thermostat 204 may determine conditions external to the building space 204 (e.g., utilizing data received from a weather service system or various sensors placed outside of the building space 202). After such variables are measured, the user 212 views the measured variables and adjusts the temperature setpoint via the user interface of the thermostat (block 304).

In response to the user providing an adjusted setpoint, the thermostat 204 executes the modules 242, 244, and 246 discussed above to generate an overall score for the adjusted setpoint (block 306). In various embodiments, if the adjusted threshold meets certain conditions (e.g., receives an overall score below a threshold), the thermostat 204 also generates a suggested alternative threshold that is more energy efficient than the adjusted threshold. The user then views the generated score and updates the adjusted setpoint (block 310).

In various embodiments, using the scores generated via the modules 242, 244, and 246, the thermostat generates a graphical user interface for presentation to the user 212 via the electronic display 228. The graphical user interface may include, for example, an energy usage estimation of the adjusted setpoint initially input by the user 212. Such an energy usage estimation may include a projected utility bill amount (e.g., based on utility data received from the utility service system 220 and historical HVAC system data). The graphical user interface may also include the overall score and the various subcomponent scores generated via execution of the modules 242, 244, and 246 described herein. Additionally, the graphical user interface may include a system performance portion indicating to the required run times of the HVAC equipment 216 to maintain the internal temperature of the building space 202 at the adjusted setpoint. In some embodiments, the graphical user interface also includes a suggested alternative setpoint, and energy usage and system performance estimates for the alternative setpoint. This way, the user is educated about the overall impact on the environment of a particular setpoint in real time.

For example, the user may view the graphical user interface and select the alternative, more energy efficient setpoint instead of the original adjusted setpoint initially input by the user. In response, the thermostat 204 provides control signals to the controller 214 to cause the HVAC equipment 216 to run at the updated adjusted setpoint (block 312). As such, the systems and methods disclosed herein provide the user with real-time feedback as to the environmental impact of desired setpoints, and also provide users with information regarding energy that may be saved by operating the HVAC equipment 216 at an alternative level.

Figure 4:
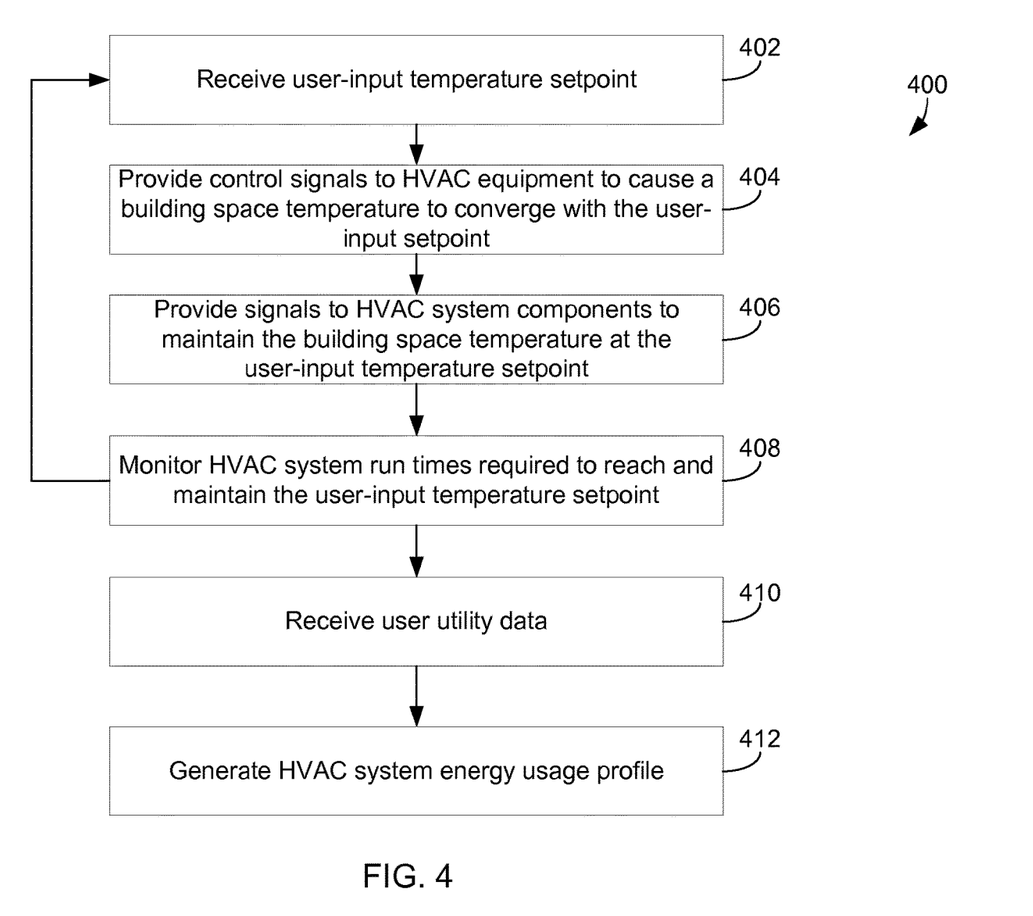
FIG. 4 is a flowchart of a process of generating an energy usage and cost profile for an HVAC system, according to an example embodiment.

Referring now to FIG. 4, a process 400 for generating an energy usage profile for an HVAC system is shown, according to an example embodiment. Process 400 may be performed by the system 200 as described with reference to FIGS. 2A-2B. In process 400, thermostat 204 receives a user-input temperature setpoint (block 402). In response (or after generating a score for the user-input setpoint and presenting the user with the graphical user interface discussed above), the thermostat 204 may provide control signals to the HVAC equipment 216 to cause a temperature inside of the building space 202 to converge with the user-input temperature setpoint (block 404). After the internal temperature of the building space 202 reaches the user-input temperature setpoint, the thermostat 204 may provide signals to periodically activate the HVAC equipment 216 to maintain the temperature of the building space 202 at the user-input temperature setpoint.

As these control signals are being provided to the HVAC equipment, the thermostat 204 monitors the system run times required to reach and maintain the temperature in the building space 202 at the user-input temperature setpoint (block 408). For example, the thermostat 204 may maintain a data log tracking the internal temperature of the building space 202 at various times as well as the amount of time that the HVAC equipment 216 is running. Additionally, the thermostat 204 may receive user utility data (block 410) describing the user's utilization of an energy form (e.g., electricity, natural gas) over a predetermined period (e.g., week, month, etc.). Based on the stored system run time data, and the thermostat 204 associates an energy utilization amount with each setpoint. For example, the thermostat 204 may allocate a portion of the user's total energy utilization to a particular setpoint based on the amount of time that the HVAC equipment 216 was being operated at the setpoint.

The thermostat 204 then generates an HVAC system energy usage profile (block 412). The energy usage profile may include a number of different entries pertaining to a number of different setpoints of operation for the HVAC equipment 216. For example, there may a number of entries associated with each setpoint associated with different weather conditions (e.g., temperature and humidity ranges outside the building space 202). Each entry may include an associated run time required by the HVAC equipment 216 to reach and maintain the building space's 202 temperature at the setpoint. As described herein, utilizing this profile, the thermostat 204 may estimate the energy usage associated with a particular user-input setpoint, and generate the overall score described herein.

Figure 5:
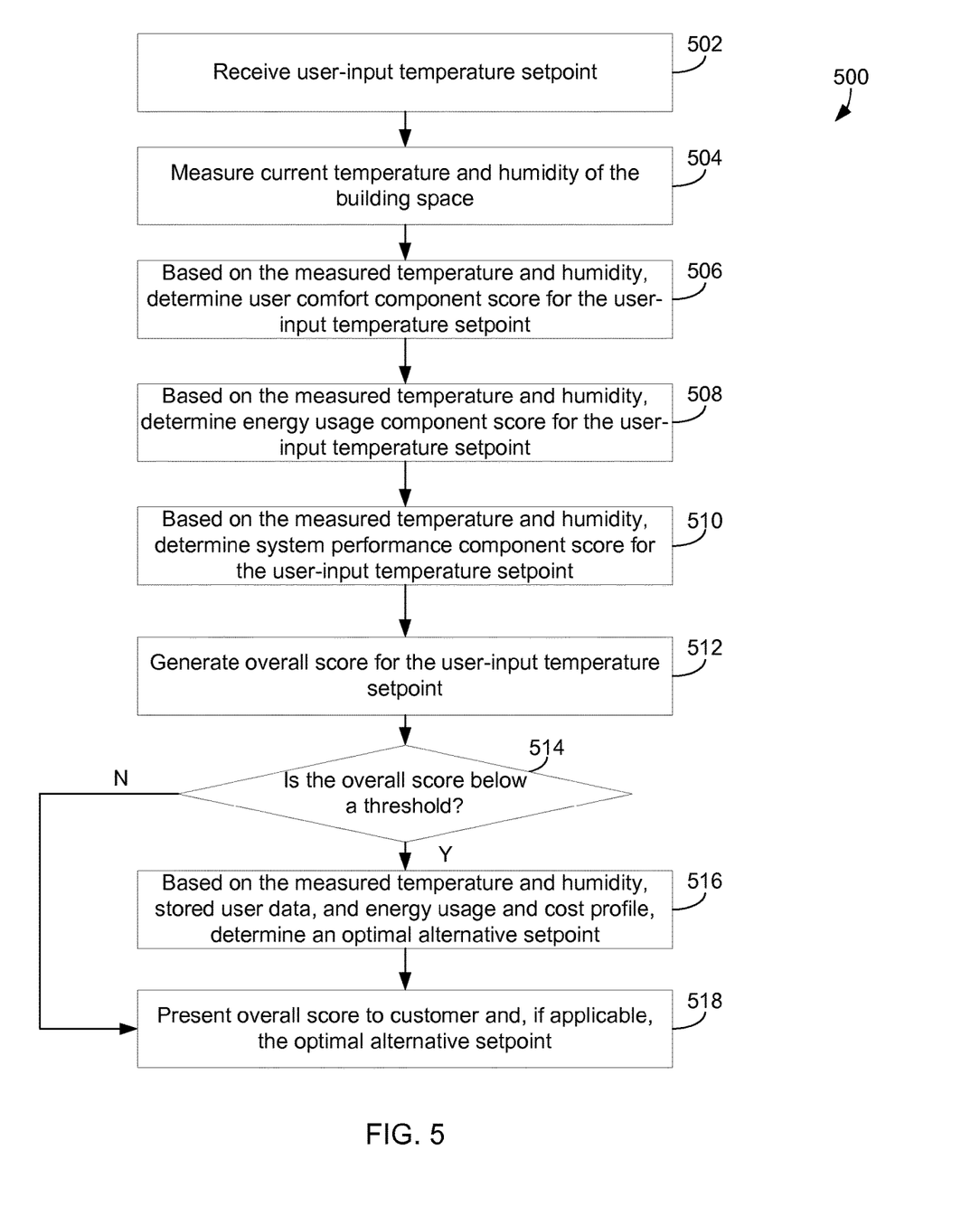
FIG. 5 is a flowchart of a process of presenting the user with a score for a user-provided temperature setpoint, according to an example embodiment.

Referring now to FIG. 5, a process 500 for monitoring and controlling the temperature of a building space in accordance with an environmental setpoint is shown, according to an example embodiment. Process 500 may be performed by the system 200 as described with reference to FIGS. 2A-2B. In process 500, thermostat 204 receives a user-input temperature setpoint (block 502). Thermostat 204 then measures the current temperature and humidity inside of and/or outside of the building space 202 (block 504). Based on the measured temperature and humidity, thermostat 204 generates a user comfort component score for the user-input temperature setpoint. As described herein, the comfort scoring module 242 may include a comfort standard that provides a suggested setpoint value based on the measured temperature and humidity. Based on a difference between the user-input setpoint and a setpoint suggested by the standard, the thermostat 204 may compute the user comfort component score. Alternatively, the user comfort score may be generated based on historical HVAC system usage data stored in the memory 236 (e.g., based on a deviation between the user-input setpoint and a historical average setpoint utilized by the user during times of similar temperature and humidity).

Also based on the measured temperature and humidity, thermostat 204 determines an energy usage component score for the user-input setpoint (block 508). For example, the processor 234 may retrieve an entry from an energy usage profile of the HVAC equipment 216 (e.g., generated via process 400 described with respect to FIG. 4). The retrieved entry may include an energy usage estimation determined based on historical usage data and user utility data. Based on the estimation, thermostat 204 generates the energy usage component score for the user-input temperature setpoint. Also based on the energy usage profile, thermostat 204 estimates a system run time to reach the user-input setpoint and generates a system performance component score for the user-input setpoint (block 510).

In some embodiments, the thermostat 204 estimates the energy usage and system performance components based on a simulation algorithm (e.g., provided by the manufacturer of the HVAC equipment 216). For example, rather than retrieving previous performance data associated with a specific user-input setpoint, the thermostat 204 may perform a simulation based on generic performance data of the HVAC equipment 216. For example, the thermostat 204 may estimate system run times and energy usage amounts for the user-input setpoint based on the most recent performance of the HVAC equipment 216 (e.g., a previously measured rate at which HVAC equipment 216 is capable of changing the temperature within the building space 202). This way, only the most recent state of operation of the HVAC equipment 216 is used in determining the energy usage and system run time estimates.

After generating the component scores for the user-input setpoint, thermostat 204 computes an overall score for the setpoint (block 512) as a weighted combination if the various component scores. As described herein, the particular weights used by the thermostat 204 in determining the overall score may depend on a mode of operation (e.g., a "comfort mode," an "energy efficiency mode," or a "system performance mode") that the user has placed the thermostat 204 into. The generated overall score is then compared with a threshold (block 514). If the overall score is above the threshold, process 500 advances to present the user with a graphical user interface including the overall score (block 518). The graphical user interface may include the overall score, information regarding the estimated energy level associated with the user-input setpoint, and information regarding the system performance (e.g., an estimated time to reach to the user-input setpoint).

However, if the overall score is below a threshold, thermostat 204 computes an alternative setpoint based on the measured temperature and humidity (block 516). For example, based on a measured temperature and humidity outside of the building space 202, the thermostat 204 may identify an alternative setpoint that is more energy efficient than the initial user-input energy setpoint. For example, when the HVAC equipment 216 is in a cooling mode, the thermostat 204 may select the lowest alternative setpoint having an energy usage subcomponent score that is above a threshold. This way, the thermostat 204 maximizes user comfort while enabling the user to select the alternative setpoint to operate the HVAC equipment 216 at a more energy efficient level.

The construction and arrangement of the systems and methods as shown in the various example embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the example embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A thermostat of an environmental control system of a building, the thermostat comprising a processing circuit, the processing circuit configured to:
    receive a temperature setpoint;
    generate an overall score for the temperature setpoint, the overall score taking into account energy usage resulting from operating the environmental control system at the temperature setpoint and user comfort resulting from operating the environmental control system at the temperature setpoint; and
    cause a user interface to display a setpoint scoring interface comprising the overall score.

2. The thermostat of claim 1, wherein the overall score is a weighted combination of an energy usage amount and a user comfort score and is based on one or more weight values, wherein the one or more weight values are based on a mode of operation of the thermostat.

3. The thermostat of claim 1, wherein the thermostat further comprises the user interface, wherein the user interface is configured to present information to a user and receive one or more inputs from the user;

wherein the processing circuit is configured to receive the temperature setpoint via the user interface.

4. The thermostat of claim 1, wherein the processing circuit is configured to provide control signals to components of the environmental control system to control an air temperature of the building to the temperature setpoint, wherein the processing circuit is configured to cause the user interface to display the setpoint scoring interface comprising the overall score before providing the control signals to the components of the environmental control system.

5. The thermostat of claim 1, wherein the processing circuit is configured to:
   determine that the overall score is above a threshold score;
   generate an alternative setpoint, the alternative setpoint associated with a first projected energy usage less than a second projected energy usage associated with the temperature setpoint, wherein the setpoint scoring interface includes the alternative setpoint;
   receive, via the user interface, a user selection to use the alternative setpoint; and
   provide control signals to components of the environmental control system to control an air temperature of the building to the alternative setpoint.

6. The thermostat of claim 1, wherein the processing circuit is configured to:
   determine required run times for the environmental control system to operate at a plurality of setpoints, wherein each setpoint is associated with a plurality of required run times, wherein each required run time is associated with a temperature external to the building and an initial measured temperature inside the building;
   store the required run times in a memory device;
   receive user utility usage data; and
   based on the user utility usage data, project a utility usage amount for each of the required run times for each of the plurality of setpoints by retrieving a first run time and an associated utility usage amount from the memory device.

7. The thermostat of claim 1, further comprising a humidity sensor configured to measure a humidity of the building;
   wherein the processing circuit is configured to:
      receive the humidity from the humidity sensor; and
      generate the overall score based on the humidity.

8. The thermostat of claim 1, further comprising a temperature sensor configured to measure a temperature of the building;
   wherein the processing circuit is configured to:
      compare the temperature setpoint to an air temperature measured by the temperature sensor;
      project an energy usage amount for the temperature setpoint based on a comparison of the temperature setpoint compared to the air temperature; and
      generate the overall score based on the energy usage amount.

9. The thermostat of claim 8, wherein the setpoint scoring interface further comprises the energy usage amount.

10. The thermostat of claim 1, further comprising a temperature sensor configured to measure a temperature of the building;
    wherein the processing circuit is configured to:
       generate a user comfort score for the temperature setpoint based on a comparison of the temperature setpoint compared to an air temperature; and
       generate the overall score based on the user comfort score.

11. The thermostat of claim 10, wherein the setpoint scoring interface further comprises the user comfort score.

12. The thermostat of claim 11, wherein the thermostat further comprises a humidity sensor configured to measure a humidity of the building;
    wherein the processing circuit is configured to generate the overall score based on the humidity by:
       identifying a recommended temperature from a pre-established set of recommended temperature values based on the humidity; and
       determining a difference between the temperature setpoint and the recommended temperature, wherein the user comfort score is proportional to the difference.

13. The thermostat of claim 12, wherein the pre-established set of recommended temperature values are based on a comfort curve.

14. The thermostat of claim 12, wherein the pre-established set of recommended temperature values comprise a set of setpoints previously input into the thermostat.

15. A method for an environmental control system of a building, the method comprising:
    receiving, by a processing circuit, a temperature setpoint via a user interface;
    generating, by the processing circuit, an overall score for the temperature setpoint, the overall score taking into account energy usage resulting from operating the environmental control system at the temperature setpoint and user comfort resulting from operating the environmental control system at the temperature setpoint; and
    causing, by the processing circuit, the user interface to display a setpoint scoring interface comprising the overall score.

16. The method of claim 15, further comprising:
    determining, by the processing circuit, required run times for the environmental control system to operate at a plurality of setpoints, wherein each setpoint is associated with a plurality of required run times, wherein each required run time is associated with a temperature external to the building and an initial measured temperature inside the building;
    storing, by the processing circuit, the required run times in a memory device;
    receiving, by the processing circuit, user utility usage data; and
    based on the user utility usage data, projecting, by the processing circuit, a utility usage amount for each of the required run times for each of the plurality of setpoints by retrieving a first run time and an associated utility usage amount from the memory device.

17. The method of claim 15, further comprising:
    receiving, by the processing circuit, an air temperature measured by a temperature sensor;
    comparing, by the processing circuit, the temperature setpoint to the air temperature measured by the temperature sensor;
    projecting, by the processing circuit, an energy usage amount for the temperature setpoint based on a comparison of the temperature setpoint compared to the air temperature; and
    generating, by the processing circuit, the overall score based on the energy usage amount.

18. The method of claim 15, further comprising:
generating, by the processing circuit, a user comfort score for the temperature setpoint based on a comparison of the temperature setpoint compared to an air temperature; and
generating, by the processing circuit, the overall score based on the user comfort score.

19. The method of claim 18, wherein the method further comprises, receiving, by the processing circuit a humidity of the building from a humidity sensor;
wherein generating, by the processing circuit, the overall score based on the humidity comprises:
identifying, by the processing circuit, a recommended temperature from a pre-established set of recommended temperature values based on the humidity; and
determining, by the processing circuit, a difference between the temperature setpoint and the recommended temperature, wherein the user comfort score is proportional to the difference.

20. A control system for a heating, ventilating, and air conditioning (HVAC) system, the control system comprising:
a temperature sensor configured to measure an air temperature inside of a building; and
a processing circuit, the processing circuit comprising a processor and a memory, the memory storing instructions that are executable by the processor that cause the processor to:
receive, by a user interface, a user-preferred temperature setpoint;
compare the user-preferred temperature setpoint to the air temperature;
based on the comparison, project an energy usage amount for the user-preferred temperature setpoint;
based on the comparison, generate a user comfort score for the user-preferred temperature setpoint;
based on the projected energy usage amount and the user comfort score, generate an overall score for the user-preferred temperature setpoint; and
present, by the user interface, the user with a setpoint scoring interface including the overall score.

* * * * *